(12) United States Patent
Enenkel

(10) Patent No.: US 10,836,591 B2
(45) Date of Patent: Nov. 17, 2020

(54) APPARATUS FOR HANDLING ARTICLES IN A TRANSPORTING UNIT, IN PARTICULAR AN INTERCHANGEABLE CONTAINER, AND UNLOADING APPARATUS

(75) Inventor: Peter Enenkel, Constance (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 2114 days.

(21) Appl. No.: 13/277,568

(22) Filed: Oct. 20, 2011

(65) Prior Publication Data

US 2012/0207572 A1 Aug. 16, 2012

(30) Foreign Application Priority Data

Oct. 20, 2010 (DE) .......................... 10 2010 042 705
Feb. 15, 2011 (EP) ..................................... 11154522

(51) Int. Cl.
*B60P 1/40* (2006.01)
*B65G 67/08* (2006.01)

(52) U.S. Cl.
CPC .................................. *B65G 67/08* (2013.01)

(58) Field of Classification Search
CPC .................................. B60P 1/40; B60P 1/44
USPC ........ 414/502, 503, 505, 509, 523, 532, 398
See application file for complete search history.

(56) References Cited

U.S. PATENT DOCUMENTS

| | | | |
|---|---|---|---|
| 3,679,074 A * | 7/1972 | Kuehl | 414/523 |
| 3,779,404 A | 12/1973 | McWilliams | |
| 5,558,485 A | 9/1996 | Haynes | |
| 5,577,873 A | 11/1996 | Tanaka et al. | |
| 5,685,416 A * | 11/1997 | Bonnet | B65G 21/14 198/812 |
| 5,697,753 A * | 12/1997 | Aurora | B65G 67/08 414/398 |
| 5,795,124 A * | 8/1998 | Kitten | A01C 3/06 198/550.12 |
| 6,213,167 B1 * | 4/2001 | Greenland | 141/10 |
| 9,738,466 B2 | 8/2017 | Pippin | |
| 2006/0032957 A1 * | 2/2006 | Kolbet | B02C 18/0007 241/101.74 |
| 2007/0152088 A1 * | 7/2007 | Kolbet et al. | 241/101.74 |

(Continued)

FOREIGN PATENT DOCUMENTS

| | | |
|---|---|---|
| AU | 7677398 A | 12/1998 |
| CN | 1195774 A | 10/1998 |

(Continued)

*Primary Examiner* — Saul Rodriguez
*Assistant Examiner* — Willie Berry, Jr.
(74) *Attorney, Agent, or Firm* — Laurence Greenberg; Werner Stemer; Ralph Locher

(57) ABSTRACT

An apparatus for handling articles in a transporting unit, which may be an interchangeable container, having a mobile conveying unit that is moved into the transporting unit to unload the unit, collect and receive articles stacked in the unit under the control of an operator, and convey the articles out of the transporting unit in an unloading direction for further processing. The apparatus generally facilitates removal from the transporting unit with a small amount of effort during the unloading of non-uniformly or randomly stacked articles. The conveying unit has a floor conveyor which conveys in a loose random arrangement the articles that have been toppled or removed from the stack of articles.

14 Claims, 7 Drawing Sheets

(56) References Cited

U.S. PATENT DOCUMENTS

| | | |
|---|---|---|
| 2008/0118337 A1 | 5/2008 | Vestergaard |
| 2008/0314718 A1* | 12/2008 | Asam .................. 198/419.3 |
| 2009/0074546 A1 | 3/2009 | Christensen et al. |
| 2009/0169349 A1 | 7/2009 | Reed |
| 2009/0285661 A1* | 11/2009 | Nespor .............. B60P 1/02 414/545 |
| 2011/0083411 A1* | 4/2011 | Mackin ............ A01D 41/1217 56/10.2 R |
| 2012/0087770 A1 | 4/2012 | Pippin |
| 2013/0094931 A1* | 4/2013 | Bluhm ............... B60P 1/431 414/523 |

FOREIGN PATENT DOCUMENTS

| | | |
|---|---|---|
| CN | 200992412 Y | 12/2007 |
| CN | 101209776 A | 7/2008 |
| CN | 201454685 U | 5/2010 |
| DE | 4102809 A1 | 8/1992 |
| DE | 69414226 T2 | 3/1999 |
| DE | 102007024670 A1 | 12/2008 |
| DE | 10 2007 038 839 A1 | 2/2009 |
| DE | 102008036721 A1 | 2/2010 |
| DE | 102010015299 A1 | 10/2011 |
| DE | 102010033115 A1 | 2/2012 |
| EP | 1827901 B1 | 9/2007 |
| WO | 9854073 A1 | 12/1998 |
| WO | 2005092706 A1 | 10/2005 |
| WO | 2006061495 A1 | 6/2006 |
| WO | 2006117003 A1 | 11/2006 |
| WO | 2009021628 A1 | 2/2009 |

\* cited by examiner

APPARATUS FOR HANDLING ARTICLES IN A TRANSPORTING UNIT, IN PARTICULAR AN INTERCHANGEABLE CONTAINER, AND UNLOADING APPARATUS

BACKGROUND OF THE INVENTION

Field of the Invention

The invention relates to an apparatus for handling articles in a transporting unit, in particular an interchangeable container, having a mobile conveying unit which is moved into the transporting unit in order to unload the latter, picks up articles stacked therein under the control of an operator and conveys said articles out of the transporting unit in an unloading direction for further processing.

Articles, in particular in the form of stackable shipping units such as parcels, sacks, packages, palletized products etc., are nowadays transported predominantly with the aid of standard transporting units, which are preferably conveyed by road or rail. These transporting units are preferably configured as interchangeable trailers which a person skilled in the art knows as "interchangeable containers" or "swap bodies".

Although the sorting of transported articles in sorting centers is being optimized by continuous developments, the manual unloading of the transporting units at the entrance gates of such sorting or distribution centers continues to represent a bottleneck which has a not inconsiderable influence on the distribution of the shipping units.

The manual loading of nonuniform articles into the transporting units results in stacks of articles having a highly irregular stacking arrangement. Therefore, unloading can only take place manually. The handling of such nonuniform loads can be compared to the handling of bulk material. During the unloading of such loads, it is conventional for the to some extent chaotically stacked goods to collapse and to be laboriously picked up again by an operator and deposited in a regular manner on a conveyor. It is known to introduce a telescopic conveyor into the transporting unit, with an operator depositing the articles on the conveyor manually, individually and in a regular manner.

BRIEF SUMMARY OF THE INVENTION

The object of the invention is to provide an apparatus of the generic type, by means of which articles can be removed from the transporting unit with a small amount of effort during the unloading of nonuniformly or randomly stacked articles.

To this end, it is proposed that the conveying unit has a floor conveyor which conveys in a loose arrangement the articles that have been toppled from the stack of articles. As a result, articles which drop down from the stack of articles on account of an irregular stacking arrangement and/or on account of guided toppling of the articles by the operator are collected directly on the floor conveyor and conveyed further. Manipulation of the articles that have dropped down by the operator, in particular laborious lifting of the articles and the deposition thereof on the conveying unit, can in this case be reliably avoided. "Guided" toppling of articles should be understood as meaning toppling brought about by deliberate or controlled manipulation of the articles in the stack of articles by the operator, in particular by means of a tool.

On account of the fact that the floor conveyor is configured, in particular dimensioned, such that the articles can be conveyed in a loose arrangement, time-consuming deposition of the articles in a regular manner can furthermore be dispensed with. Articles that have toppled onto the floor conveyor can thus be conveyed further in a piled manner by a conveying means of the floor conveyor without being manipulated by the operator. Therefore, the unloading throughput of the transporting unit can be increased, as a result of which the disadvantageous effects of a bottleneck at the unloading location of a sorting or distribution center can be reduced. If the transporting unit has an elongate design, the unloading direction corresponds expediently to the longitudinal direction of the transporting unit.

A "floor conveyor" should be understood in particular as meaning a conveyor that forms a conveying plane which is arranged in the floor region of the transporting unit, at least during an unloading operation in the transporting unit. In this case, this should be understood as meaning a plane which is at a height from the floor of at most 40 cm, preferably at most 30 cm and particularly preferably at most 20 cm, at least on a side facing the stack of articles, during the unloading operation in the transporting unit. It is particularly advantageous for the conveying plane to be arranged, at least during the unloading operation, at most at the level of the feet of the operator in relation to the floor of the transporting unit. The conveying plane is preferably oriented horizontally, i.e. parallel to the floor, but it can be inclined upward in the unloading direction.

The apparatus preferably has a conveying device which is connected in conveying terms to the mobile conveying unit, is arranged at least partially in a fixed manner on a floor and serves to convey the articles that have been transported out of the transporting unit by means of the conveying unit to a processing installation, such as a sorting installation, for example, for further processing. In order to be moved into a transporting unit that has been docked at a sorting and/or distribution center, the mobile conveying unit is advantageously configured to be movable in relation to the fixed part of the conveying device, said fixed part in particular being arranged in a fixed manner within the sorting and/or distribution center. The conveying device forms a conveying plane, wherein the conveying plane formed by the floor conveyor is arranged preferably lower than the conveying plane of the fixed conveying device, at least during an unloading operation in the transporting unit, on account of its arrangement in the region of the floor of the transporting unit. The difference in height between the conveying planes can be overcome by means of an oblique conveying plane.

The conveying device furthermore advantageously has a movable part which adjoins the mobile conveying unit. This can be achieved in a structurally simple manner, by the conveying device being configured as a telescopic device. The conveying device can furthermore serve to drive the movement of the mobile conveying unit. Alternatively, or in addition, the mobile conveying unit can have a separate drive unit.

The mobile conveying unit, in particular the floor conveyor, is expediently provided with an undercarriage, which makes it possible for said floor conveyor to move on a floor, in particular on the floor of the transporting unit. In particular, the undercarriage has a set of wheels and/or rollers, by means of which the conveying unit, in particular the floor conveyor, can roll on the floor.

On account of the movability of the mobile conveying unit, the floor conveyor, depending on the progress of the unloading operation, can be moved in the direction of the stack of articles so that the conveying plane of the floor conveyor can always be arranged at the foot of the stack of articles. This makes it possible to achieve easy operation when the conveying unit has an operating apparatus which is provided so that the operator can actuate a movement of at least the floor conveyor.

In order to achieve a particularly high rate of collecting dropping articles by the floor conveyor, it is proposed that the floor conveyor forms a conveying plane which is dimensioned such that it extends perpendicularly to the unloading direction over at least a substantial part of the width of the transporting unit, which is configured as a standard container. The "width" of a unit should be understood as meaning in particular the horizontal extent of the unit perpendicular to the unloading direction. A "substantial" part of the width should be understood as meaning in particular at least 50%, advantageously at least 75% and preferably at least 90% of the width of the transporting unit. The transporting unit is preferably configured as a standard interchangeable container, which is dimensioned in accordance with the requirements for road and/or rail transport. In particular, the transporting unit can be embodied as a transporting unit dimensioned in accordance with the standard "EN 284".

In a preferred refinement of the invention, it is proposed that the apparatus has a tool unit which is provided to be operated by the operator for the guided toppling of articles from the stack of articles. As a result, rapid unloading of the transporting unit and high working comfort for the operator can be achieved.

In this connection, it is proposed that the tool unit is secured to the conveying unit. As a result, the working comfort for the operator can be increased in a structurally simple and space-saving manner.

The ease of use for the operator can furthermore be increased in that the conveying unit has a working platform which is provided to be walked on by the operator.

In this connection, it is proposed that the conveying unit is moved in a moving-in direction into the transporting unit for an unloading operation and the working platform is arranged at the front end of the conveying unit with respect to the moving-in direction. As a result, a space for the operator next to or in front of the conveying unit can be dispensed with, it being possible for the conveying plane formed by the floor conveyor to be dimensioned to have a large width and/or for the conveying unit to be moved directly up to the foot of the stack of articles, adjoining the latter. In this embodiment, the working platform is advantageously arranged—as seen in the unloading direction—in front of the conveying plane. With such an embodiment of the working platform, the operator—standing between the stack of articles and the floor conveyor—can perform his work at a small distance from the stack of articles and the floor conveyor, and it is possible to achieve short toppling distances for the articles from their position in the stack of articles to the floor conveyor.

It is furthermore proposed that the floor conveyor forms a conveying plane and the working platform extends perpendicularly to the unloading direction over at least a substantial part of the width of the conveying plane. As a result, an advantageous freedom of movement of the operator in relation to the conveying plane can be achieved, it being possible for the articles to be unstacked in a particularly efficient manner. In order to achieve optimum freedom of movement in relation to the conveying plane, it is proposed that the working platform extends at least over the width of the conveying plane. Particularly preferably, the working platform extends perpendicularly to the unloading direction over at least a substantial part of the width of the transporting unit.

In a further embodiment of the invention, it is proposed that the floor conveyor has a set of conveying means, wherein at least two conveying means each have a different conveying direction. As a result, even within the transporting unit, the piled flow of material can be concentrated, it being possible for conveying means adjoining the mobile conveying unit outside the transporting unit to be embodied with a smaller width perpendicular to the direction of the flow of material than the width of the conveying plane formed by the floor conveyor. The different conveying directions of the floor conveyor can correspond to the unloading direction and a direction—for concentrating the flow of material—which tends to move articles that have toppled onto the edge of the floor conveyor in the direction of the middle of the floor conveyor.

In a preferred embodiment of the invention, the apparatus has a separating device for separating articles unloaded from the transporting unit, said separating device being connected in conveying terms to the conveying unit, as a result of which the flow of material can be prepared efficiently for the purpose of sorting. "Separating" the articles should be understood as meaning in particular an operation of handling the flow of material, wherein following the completion of this handling operation the flow of material consists of articles that are arranged one after another in a row.

Careful handling of the articles can furthermore be achieved if the conveying unit has a cushioning unit which is provided to cushion the toppling of the articles onto the floor conveyor.

In a further refinement of the invention, it is proposed that the conveying unit has a chute which serves to guide articles that drop down from the stack of articles onto the floor conveyor.

The invention furthermore proceeds from an unloading apparatus for unloading a transporting unit for transporting articles, having a conveying unit which is provided for conveying the articles in an unloading direction out of the transporting unit and has at least one conveying plane.

In order to achieve the abovementioned object of providing an apparatus of the generic type, by means of which articles can be removed from the transporting unit with a small amount of effort during the unloading of nonuniformly or randomly stacked articles, it is proposed that the unloading apparatus comprises at least one collecting device for collecting articles, said collecting device having at least one collecting region which is arranged higher than the conveying plane. As a result, in the case of loose unloading of the transporting unit, in which articles stacked in the transporting unit drop down from a stack or are toppled by an operator, a particularly careful unloading operation can be achieved, since the falling height for articles arranged in the uppermost region of the stack can be reduced by the collection thereof.

In this connection, a "collecting device" should be understood as meaning a device which is provided to interrupt the free fall of articles that drop down from a stack of articles and to divert said articles before they reach the lower conveying plane or the floor of the transporting unit. By way of a collecting region which is arranged higher than the conveying plane, toppling of the collected articles onto the conveying plane or onto the floor of the transporting unit can be prevented. The terms "height, higher" etc. relate to the vertical direction, it being possible for a height to be defined in relation to the floor of the transporting unit.

In a preferred configuration of the invention, it is proposed that the conveying unit is configured as a mobile conveying unit which is moved into the transporting unit for an unloading operation. As a result, the conveying plane can advantageously be moved, as required, as close as possible to the stack of articles. The conveying unit is preferably displaced in a linear manner counter to the unloading direction in the direction of the stack of articles.

In addition, it is proposed that the conveying unit has a floor conveyor that forms the conveying plane and conveys in a loose arrangement articles that have been toppled from a stack of articles. As a result, articles which are arranged lower than the collecting region in the stack of articles and drop down from the stack of articles on account of an irregular stacking arrangement and/or on account of guided toppling of the articles by an operator can be collected directly on the floor conveyor and conveyed further. Manipulation of the articles that have dropped down by the operator, in particular laborious lifting of the articles and the deposition thereof on the conveying unit, can in this case be reliably avoided. On account of the fact that the floor conveyor is configured, in particular dimensioned, such that the articles can be conveyed in a loose arrangement, time-consuming deposition of the articles in a regular manner can furthermore be dispensed with. Articles that have toppled onto the floor conveyor can thus be conveyed further in a piled manner by a conveying means of the floor conveyor without being manipulated by the operator. Therefore, the unloading throughput of the transporting unit can be increased, as a result of which the disadvantageous effects of a bottleneck at the unloading location of a sorting or distribution center can be reduced. If the transporting unit has an elongate design, the unloading direction corresponds expediently to the longitudinal direction of the transporting unit.

A "floor conveyor" should be understood in particular as meaning a conveyor that forms a conveying plane which is arranged in the floor region of the transporting unit, at least during an unloading operation in the transporting unit. In this case, this should be understood as meaning a plane which is at a height from the floor of at most 40 cm, preferably at most 30 cm and particularly preferably at most 20 cm, at least on a side facing the stack of articles, during the unloading operation in the transporting unit. It is particularly advantageous for the conveying plane to be arranged, at least during the unloading operation, at most at the level of the feet of the operator in relation to the floor of the transporting unit. The conveying plane is preferably oriented horizontally, i.e. parallel to the floor, but it can be inclined upward in the unloading direction.

A structurally simple refinement of the unloading apparatus can furthermore be achieved if the conveying unit and the collecting device form a cohesive unit. In this case, the unloading apparatus expediently has a basic body which connects the conveying unit to the collecting device. In particular, the conveying unit and the collecting device are mounted on the basic body. If the mobile unit, as described above, is configured as a mobile conveying unit, a movement of the basic body in relation to the transporting unit advantageously brings about at the same time a movement of the conveying plane and of the collecting device. The basic body can advantageously have wall parts, which form a lateral boundary for the conveying plane and prevent conveyed articles from falling off the sides onto the floor of the transporting unit, it being possible for the collecting device to be mounted advantageously on one wall part.

Furthermore, it is proposed that the collecting region is arranged above the conveying plane at least in a working position of the collecting device. As a result, in the possible event of a collected article dropping down from the collecting device, this article can pass directly onto the conveying plane located underneath and be conveyed further from there in the unloading direction without it being necessary for an operator to manipulate the article. An arrangement "above" the conveying plane should be understood as meaning in particular that it is possible for the collecting region to project downwardly in the vertical direction into the conveying plane.

In a further embodiment of the invention, it is proposed that the collecting device has at least one guiding region which serves to guide collected articles onto the conveying plane. As a result, collected articles can pass rapidly and in a manner that is gentle to the articles onto the conveying plane, which then moves them in the unloading direction out of the transporting unit.

In this connection, the guiding region is formed expediently by a guiding device, by way of which the articles pass automatically onto the conveying plane. In particular, it is proposed that the guiding region is provided for sliding of the collected articles, as a result of which the articles, driven by their own weight force, pass onto the conveying plane and a particularly structurally simple design of the guiding region, in particular as a chute, can be achieved.

In order to achieve particularly high flexibility in the use of the unloading apparatus, it is proposed that the collecting device is mounted such that it is able to move in relation to the conveying unit. The movability can be defined in relation to a basic body of the unloading arrangement, the conveying unit being mounted on said basic body. In this connection, it is possible to save installation space, components and assembly effort if the collecting device is mounted on the basic body such that it is able to move.

In an advantageous configuration of the invention, it is proposed that the collecting device can be displaced in a linear manner at least parallel to the unloading direction. As a result, the collecting device can be moved, in relation to the conveying unit, at any time counter to the unloading direction into a working position at the stack of articles to be handled. Likewise, as required, it can advantageously be removed from the stack of articles again by an operator in the unloading direction in order as a result to clear access for the operator to a location at which there is a need for manipulation. This allows in particular easy handling of articles in the lower stack layer, said articles being arranged lower than the collecting region.

Particularly easy actuation of the collecting device can be achieved if the unloading apparatus has a guiding unit which is provided to guide the collecting device parallel to the unloading direction.

Furthermore, it is proposed that the collecting device can be pivoted about at least one axis of rotation. As a result, it is possible to achieve advantageous swing-action movements of the collecting device, by way of which the use of the collecting device in an unloading operation can be configured in a more flexible manner. For example, by the collecting device being pivoted, the latter can be moved from a working position into a position in which it has no function in the unloading operation, for example a stowed position.

Furthermore, by the collecting device being pivoted, the collecting device can be used in an unloading operation without impairing the flow of material, in particular by the collecting device being mounted in a rotatable manner such that it is pivoted by a conveyed article as the latter passes.

A particularly structurally simple refinement of the unloading device provides that the collecting device has at least one contact body, by way of which the collecting device is in contact with the conveying plane. The contact body serves preferably as a movable support for the collecting device on the conveying plane and can in this case be configured in particular as a rolling and/or sliding body. As a result, the collecting device can be mounted on the conveying unit in a stable and movable manner with particularly little design complexity.

It is furthermore proposed that the collecting device has a cushioning unit. This serves advantageously to cushion an impact brought about by the collection of an article. This can be achieved easily in that the collecting device is produced in at least one region from a material that is provided for cushioning impacts. Alternatively, or in addition, the collecting device can be provided, at at least one mounting point, with a cushioning unit.

BRIEF DESCRIPTION OF THE SEVERAL VIEWS OF THE DRAWING

Exemplary embodiments of the invention are described in the following text and illustrated in the drawings, in which.

DESCRIPTION OF THE INVENTION

Figure 1:
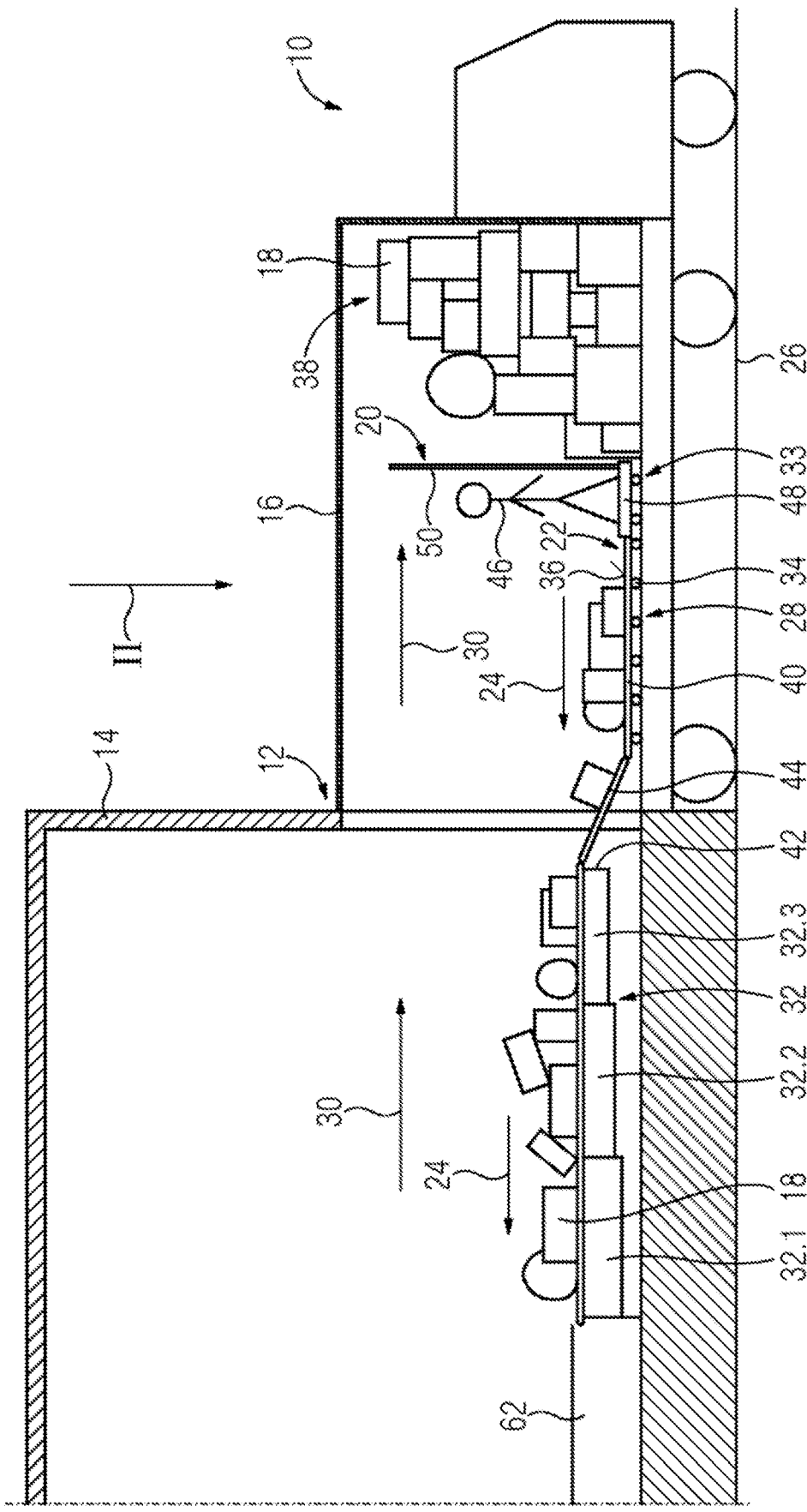
FIG. 1 shows a side view of a truck having a trailer which is docked at a distribution center and into which a mobile conveying unit has been moved.

FIG. 1 shows a schematic side view of a truck 10 which is docked at a gate 12 of a building 14, for example a distribution center, for the purpose of unloading the goods transported in said truck 10. Illustrated as the trailer of the truck is a transporting unit 16 which is configured as a standard interchangeable container (also known to a person skilled in the art as a swap body). For example, the transporting unit 16 is designed to European Standard EN 284. The goods transported correspond to articles 18, specifically in particular shipping units such as parcels, sacks, packages, palletized products, etc.

Provided to handle and in particular to unload the articles 18 stacked in the transporting unit 16 is an apparatus 20, which is provided with a conveying unit 22 for conveying the articles 18 out of the transporting unit 16 and into the building 14. Unloading takes place in an unloading direction 24, which is oriented horizontally, i.e. parallel to the floor 26, and corresponds preferably to the longitudinal extent of the transporting unit 16. The unloading direction 24 is oriented perpendicularly to the front side of the building 14. The conveying unit 22 is configured as a mobile unit which can be driven in a movement in relation to the floor 26 and to the floor of the building 14. It has a floor conveyor 28, which, in order to perform an unloading operation, is moved in a moving-in direction 30 into the transporting unit 16 docked at the building 14 and is moved out of the transporting unit 16 when unloading of the transporting unit 16 has been completed. The moving-in direction 30 is oriented horizontally and counter to the unloading direction 24. Furthermore, in the building 14 there is provided a conveying device 32, which is connected in conveying terms to the mobile conveying unit 22 and which conveys articles 18 unloaded from the transporting unit 16 further into the building 14. The conveying device 32 is configured as a telescopic device having conveying elements 32.1, 32.2, 32.3, which engage in one another, with the movement of the telescopic conveying elements 32.1, 32.2, 32.3 being coupled to a movement of the floor conveyor 28 in the moving-in direction 30. The conveying device 32 conveys the floor conveyor 28 out of the building 14 and into the transporting unit 16, with the floor conveyor 28 being provided with an undercarriage 33 consisting of rolling bodies 34, for example wheels, which roll on the floor of the transporting unit 16.

The floor conveyor 28 forms a conveying plane 36, by means of which the articles 18 that have been toppled from a stack 38 of articles in the transporting unit 16 are conveyed in the unloading direction 24. The conveying plane 36, which is oriented horizontally in the example under consideration, is to this end formed by at least one conveying means 40 of the floor conveyor 28, as is described below with respect to FIG. 2. In the moved-in state of the floor conveyor 28, the conveying plane 36 is arranged in the floor region of the transporting unit 16. To this end, the conveying unit 22 has a specific design, in that its floor conveyor 28 having the conveying plane 36 is arranged lower than the conveying device 32 arranged in the building 14. The conveying device 32 has in this case a movable end 42, which is connected in conveying terms to the conveying plane 36 by means of a conveying element 44 which is inclined downward as seen in the moving-in direction 30.

In an unloading operation, the articles 18 stacked in the transporting unit 16 pass onto the conveying unit 22, specifically onto the conveying plane 36 thereof. On account of the arrangement of the conveying plane 36 close to the floor, said conveying plane 36 is always arranged at most at the level of the feet of an operator 46. In this way, the stacked articles 18 can be manipulated by the operator 46 such that they topple easily from the stack 18 directly onto the conveying plane 36. Manipulation can take place in this case in a manner guided by means of a tool (see FIG. 3).

The floor conveyor 28 of the conveying unit 22 has furthermore at its front end—as seen in the moving-in direction 30—a region which is provided to be walked on by the operator 46. The region is used as a walkable working platform 48 on which the operator 46 stands while manipulating the articles 18. The working platform 48, which is formed by a panel, is adjoined in the unloading direction 24 by the conveying plane 36 and so the operator 46 standing on the walkable region is located, with regard to the unloading direction 24, between the articles 18 to be unloaded and the conveying plane 36. While the floor conveyor 28 is being moved in, the operator 46 can stand on the working platform 48 and so the floor conveyor 28 can be moved directly up to the foot of the stack 38, as a result of which a short toppling distance for the articles 18 from the stack 38 to the conveying plane 36 is achieved. The walkable working platform 48, which is oriented horizontally, is coplanar with the conveying plane 36, or it can, as illustrated in the figure, be slightly higher than the conveying plane 36, so that, in the moved-in state, it is arranged close to the floor, i.e. in the floor region of the transporting unit 16.

Figure 2:
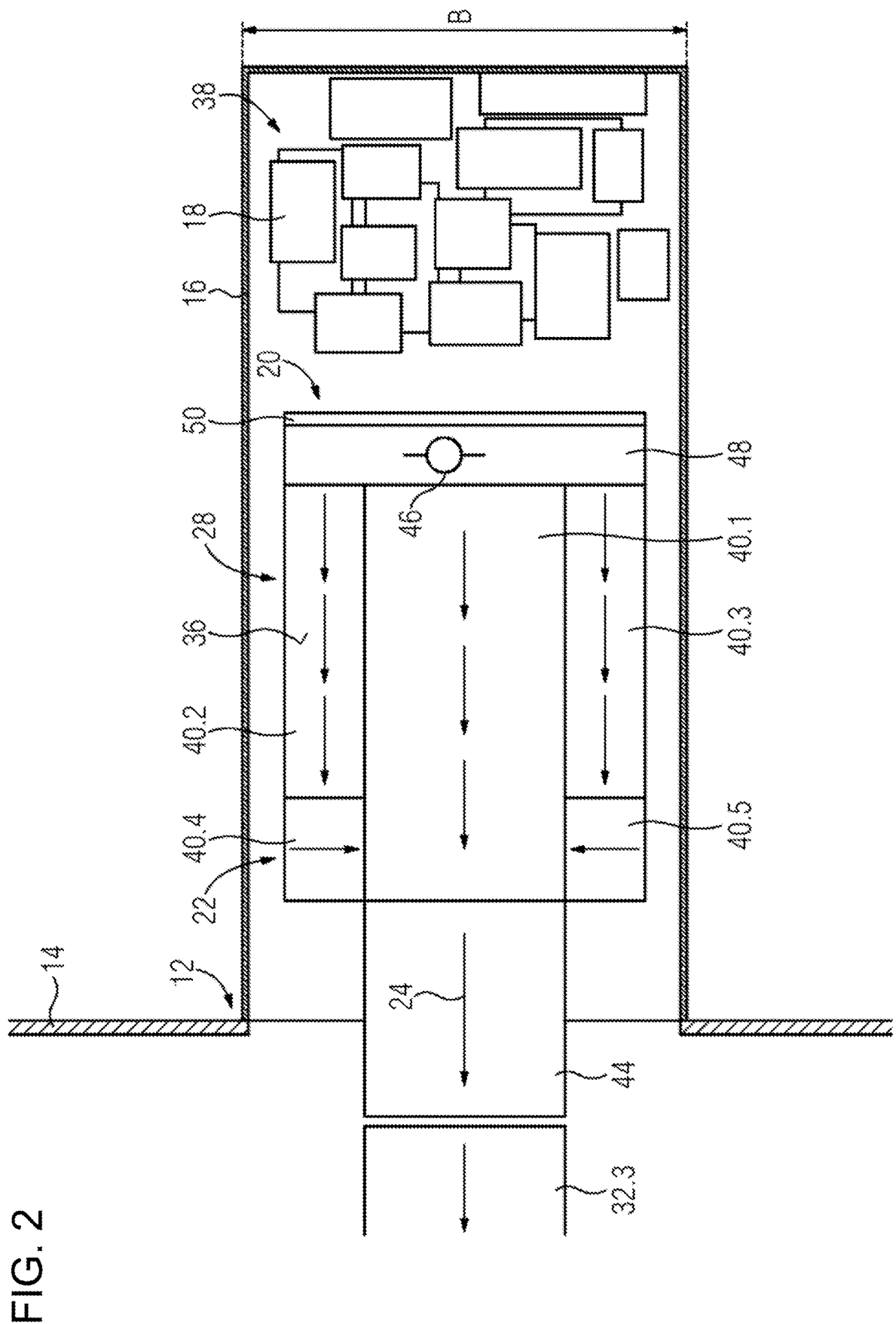
FIG. 2 shows a view from above of the arrangement in FIG. 1.

FIG. 2 shows a view from above of the transporting unit 16, with the floor conveyor 28 of the conveying unit 22 being located in a moved-in state and adjoining the stack 38 of articles 18. The transporting unit 16 has a width B, i.e. a horizontal extent perpendicular to the unloading direction 24. The floor conveyor 28 is dimensioned such that the conveying plane 36 spans more than 50% of the width B of the transporting unit 16 in the horizontal direction perpendicular to the unloading direction 24. In the example under consideration, the conveying plane 36 spans approximately 80% of the width B. On account of the low and wide configuration of the conveying plane 36, it is not necessary for the operator 46 to deposit the articles 18 in a regular manner on the conveying plane 36. The articles 18 that have been toppled onto the conveying plane 36 can be transported quickly and easily in a piled manner on the conveying plane 36, since the floor conveyor 28, in particular on account of its width, is suitable for transporting the articles 18 in a loose arrangement.

The width of the flow of material is reduced, or the flow of material can be concentrated perpendicular to the unloading direction 24, in that the conveying plane 36 is formed by a set of conveying means 40.1 to 40.5, wherein the conveying means 40 have different conveying directions. Provided starting from the walkable working platform 48 are a central conveying means 40.1 and lateral conveying means 40.2, 40.3, which convey the articles 18 in the unloading direction 24. Adjoining in each case one lateral conveying means 40.2, 40.3 in the unloading direction 24 is a further lateral conveying means 40.4 or 40.5, respectively, the conveying direction of which is directed perpendicularly to the unloading direction 24 in the direction of the central conveying means 40.1. Thus, articles 18 that have toppled onto the conveying plane 36 at the sides can be transported onto the central conveying means 40.1, which adjoins the inclined conveying element 44 for transporting into the building 14. In the example under consideration, the conveying means 40 are configured as a conveying belt.

The walkable working platform 48, which forms the front end of the conveying unit 22 and is located between the conveying plane 36 and the articles 18 to be unloaded, extends in the horizontal direction perpendicularly to the unloading direction 24 over the entire width of the conveying plane 36, as a result of which it is possible to achieve a high degree of freedom of movement for the operator 46 along the conveying plane 36.

Figure 3:
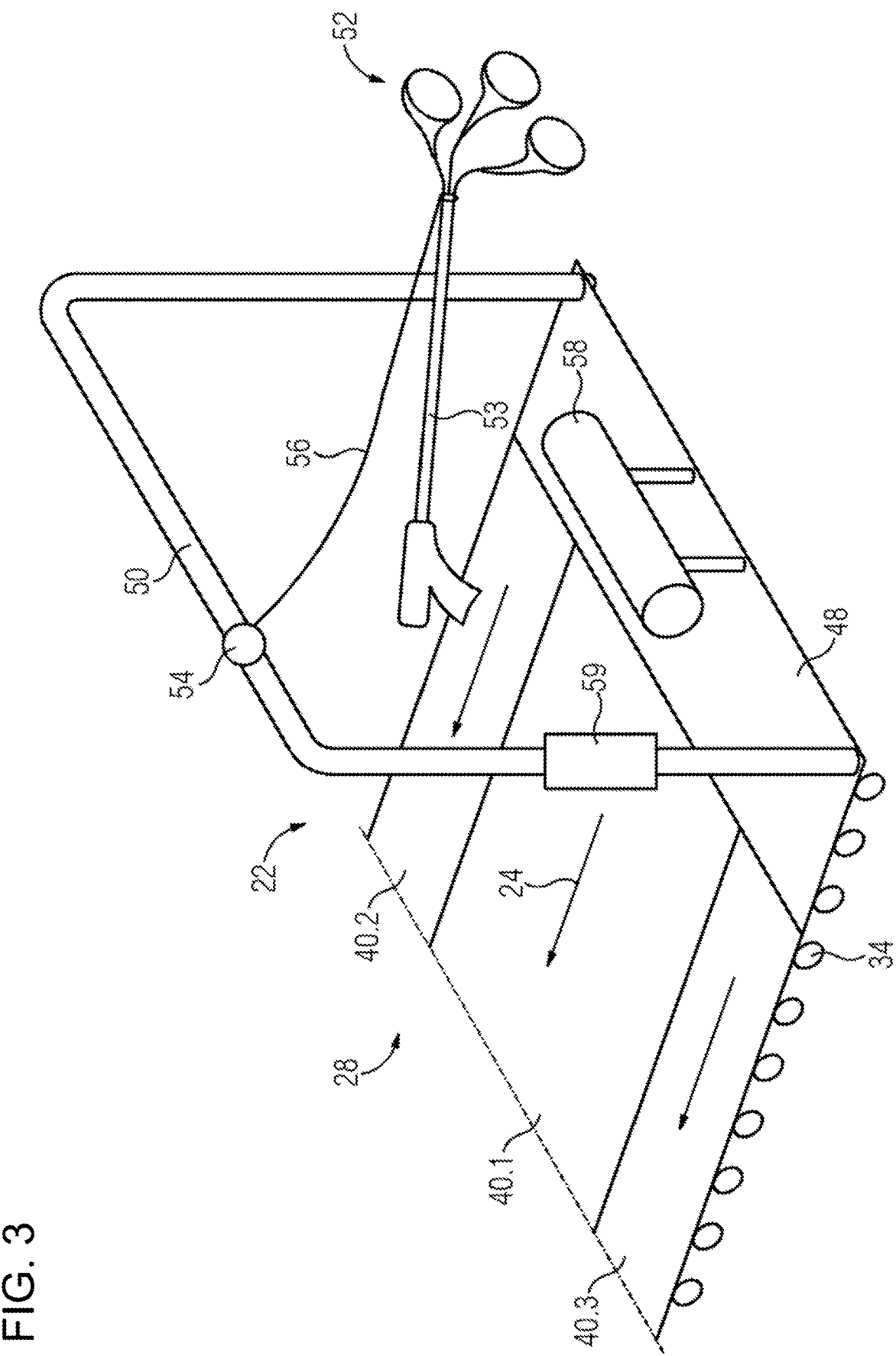
FIG. 3 shows a perspective view of the conveying unit.

FIG. 3 illustrates a perspective view of the floor conveyor 28 of the conveying unit 22. Arranged above the walkable working platform 48 is a holding device 50 which is secured to the floor conveyor 28 and serves to hold a tool unit 52 having a manipulation tool 53, which can be operated by the operator 46 to manipulate the articles 18, in particular for the guided toppling of the articles 18 from the stack 38 of articles. The holding device 50, which is fastened to the conveying unit 22 and is in the form of a bridge, has a mount 54 on which a holding means 56, which is fastened to the manipulating tool 53 and in the exemplary embodiment under consideration is in the form of a wire, is held such that it can move perpendicularly to the unloading direction 24.

Furthermore, the floor conveyor 28 is provided with a cushioning unit 58, which cushions the dropping of the articles 18 onto the floor conveyor 28 in order to provide gentle manipulation of the articles 18. The cushioning unit 58, which is fixed to the front end of the working platform 48, is in the form of a cylinder which extends perpendicularly to the unloading direction 24 and is made of a material provided for shock absorption.

An operating apparatus 59 which can be used by the operator 46 in order to actuate a movement of the floor conveyor 28 in the moving-in direction 30 or in the unloading direction 24 can furthermore be seen fastened to the holding device 50. To this end, the operating apparatus 59 is operatively connected to a drive unit (not illustrated in more detail), which is mounted on the floor conveyor 28 or is integrated into the conveying device 32 and serves to bring about a movement of the mobile floor conveyor 28.

Figure 4:
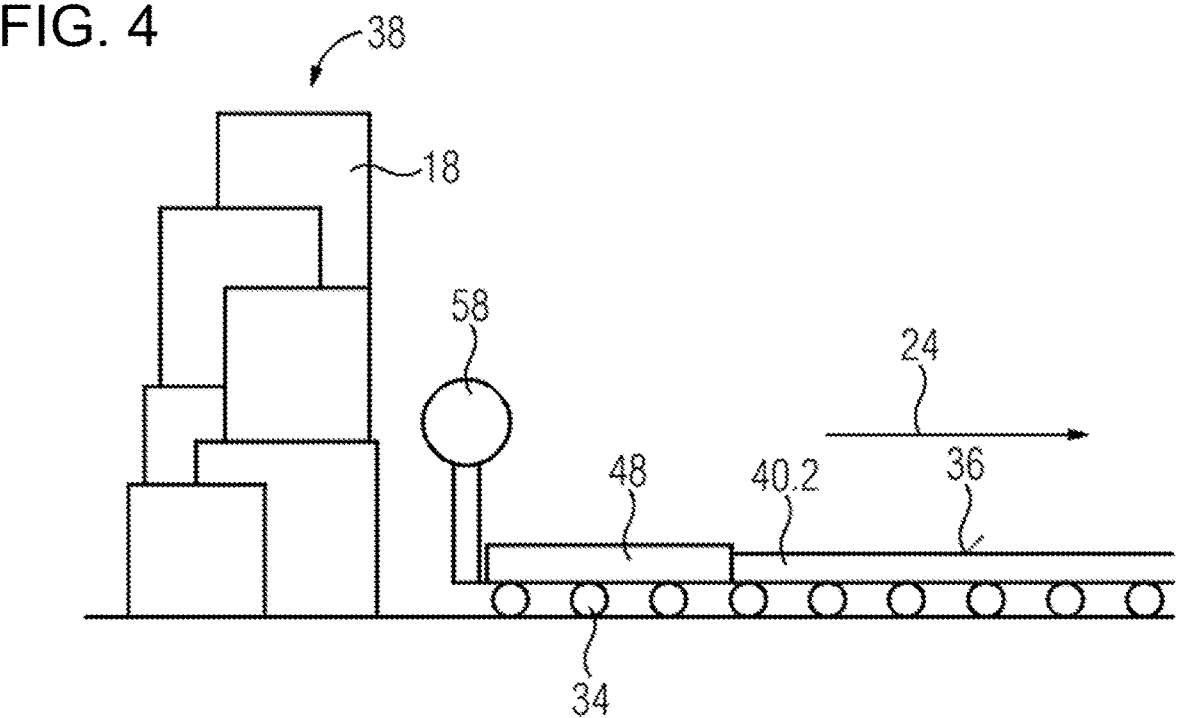
FIG. 4 shows a side view of the conveying unit.
Figure 5:
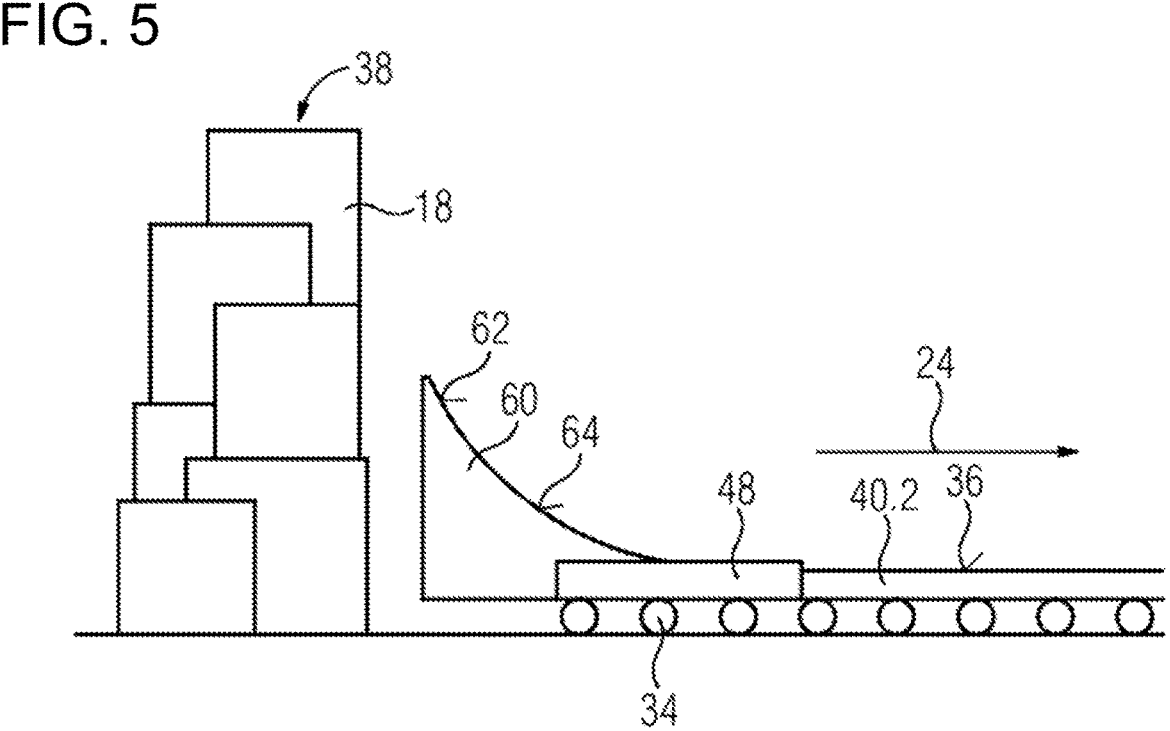
FIG. 5 shows a side view of an alternative conveying unit.

The arrangement of the cushioning unit 58 is shown in a side view in FIG. 4, the illustration of the holding device 50 having been dispensed with. Provided as an alternative or in addition to the cushioning unit 58 there may be a collecting device 60 in the form of a chute, which is fixed to the front end of the working platform 48 and—as seen in the unloading direction 24—is arranged between the stack 38 of articles 18 and the working platform 48. Said collecting device 60 has a collecting region 62 which is arranged higher than the conveying plane 36. The collecting region 62 is adjoined, in particular in a flush manner, by a guiding region 64 which serves to guide the articles 18 that drop down from the stack 38 onto the conveying plane 36, as is illustrated in FIG. 5. The material of the guiding region 64 is selected such that the articles 18 collected by the collecting region 62 slide on the guiding region 64.

As has already been mentioned above, the articles 18 can be conveyed out of the transporting unit 16 in an irregular, piled manner by the conveying unit 22 on account of the low arrangement, close to the ground, and the width of the conveying plane 36. The articles 18 are accordingly conveyed in an irregular manner into the building 14, in which they are handled further. For the purpose of sorting, which is not described in more detail here, the articles 18 are separated in the irregular flow of material. This is carried out by means of a separating device 62, which is connected in conveying terms to the conveying unit 22 and is connected downstream of the conveying unit 22 with regard to the direction of the flow of material (see FIG. 1).

FIGS. 6 to 9 show a further exemplary embodiment. In order to avoid unnecessary repetitions, the structure and the functions, the above description of which also applies to the embodiment explained below, are not reproduced in full. Reference is made to this end to the description of FIGS. 1 to 5. Components and units which have the same function in the exemplary embodiments are designated by the same reference signs.

Figure 6:
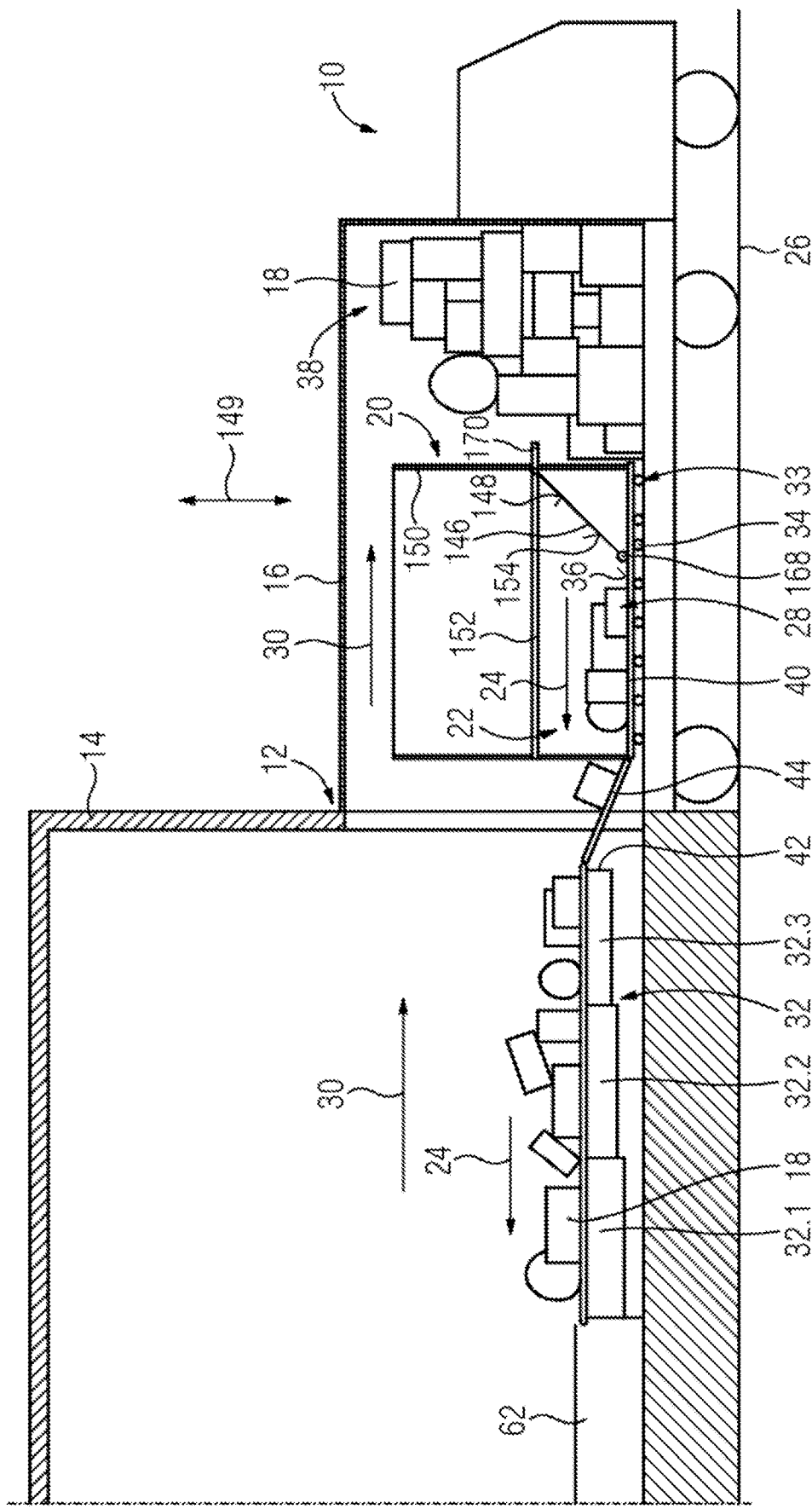
FIG. 6 shows a side view of a truck having a trailer which is docked at a distribution center and into which a mobile conveying unit has been moved.

FIG. 6 shows a schematic side view of a truck 10 which is docked at a gate 12 of a building 14, for example a distribution center, for the purpose of unloading the goods transported in said truck 10. Illustrated as the trailer of the truck is a transporting unit 16 which is configured as a standard interchangeable container (also known to a person skilled in the art as a swap body). For example, the transporting unit 16 is designed to European Standard EN 284. The goods transported correspond to articles 18, specifically in particular shipping units such as parcels, sacks, packages, palletized products, etc.

Provided to unload the articles 18 stacked in the transporting unit 16 is an unloading apparatus 20, which is provided with a conveying unit 22 for conveying the articles 18 out of the transporting unit 16 and into the building 14. Unloading takes place in an unloading direction 24, which is oriented horizontally, i.e. parallel to the floor 26, and corresponds preferably to the longitudinal extent of the transporting unit 16. The unloading direction 24 is oriented perpendicularly to the front side of the building 14. The conveying unit 22 is configured as a mobile unit which can be driven in a movement in relation to the floor 26 and to the floor of the building 14. It has a floor conveyor 28, which, in order to perform an unloading operation, is moved in a moving-in direction 30 into the transporting unit 16 docked at the building 14 and is moved out of the transporting unit 16 when unloading of the transporting unit 16 has been completed. The moving-in direction 30 is oriented horizontally and counter to the unloading direction 24. Furthermore, in the building 14 there is provided a conveying device 32, which is connected in conveying terms to the mobile conveying unit 22 and which conveys articles 18 unloaded from the transporting unit 16 further into the building 14. The conveying device 32 is configured as a telescopic device having conveying elements 32.1, 32.2, 32.3, which engage in one another, with the movement of the telescopic conveying elements 32.1, 32.2, 32.3 being coupled to a movement of the floor conveyor 28 in the moving-in direction 30. The conveying device 32 conveys the floor conveyor 28 out of the building 14 and into the transporting unit 16, with the floor conveyor 28 being provided with an undercarriage 33 consisting of rolling bodies 34, for example wheels, which roll on the floor of the transporting unit 16.

The floor conveyor 28 forms a conveying plane 36, by means of which the articles 18 that have been toppled from a stack 38 of articles in the transporting unit 16 are conveyed in the unloading direction 24. The conveying plane 36, which is oriented horizontally in the example under consideration, is to this end formed by at least one conveying means 40 of the floor conveyor 28. In the moved-in state of the floor conveyor 28, the conveying plane 36 is arranged in the floor region of the transporting unit 16. To this end, the conveying unit 22 has a specific design, in that its floor conveyor 28 having the conveying plane 36 is arranged lower than the conveying device 32 arranged in the building 14. The conveying device 32 has in this case a movable end 42, which is connected in conveying terms to the conveying plane 36 by means of a conveying element 44 which is inclined downward as seen in the moving-in direction 30.

In an unloading operation, the articles 18 stacked in the transporting unit 16 pass onto the conveying unit 22, specifically onto the conveying plane 36 thereof. On account of the arrangement of the conveying plane 36 close to the floor, said conveying plane 36 is always arranged at most at the level of the feet of an operator (not illustrated). In this way, the stacked articles 18 can be manipulated by the operator such that they topple easily from the stack 38 directly onto the conveying plane 36. Manipulation can take place in this case in a manner guided by means of a tool (not shown).

The unloading apparatus 20 has furthermore a collecting device 146, which serves for the gentle unloading of articles 18 which are stacked in the uppermost region of the transporting unit 16. To this end, the collecting device 146 is provided with a collecting region 148, which collects these articles 18 as they drop down from the stack 38. In the process, they are diverted from a free fall in which they would pass from a considerable height directly onto the conveying plane 36 (see also FIG. 3). To this end, the collecting region 148—in relation to the vertical direction 149 and to the floor of the transporting unit 16—is arranged higher than the conveying plane 36. On account of the collecting device 146, the distance which is covered by an article 18 in free fall is shortened, advantageously at least halved, as a result of which particularly gentle handling of the articles 18 during the unloading operation can be achieved.

The collecting device 146 and the conveying unit 22 form a cohesive unit. To this end, the unloading apparatus 20 has a rigid basic body 150 to which the conveying unit 22 is fastened. The basic body 150 has furthermore a mounting unit 152 by way of which the collecting device 146 is mounted on the basic body 150. The basic body 150, together with the conveying unit 22 and the collecting device 146, can be moved by means of the undercarriage 33 into the transporting unit 16 and out of the transporting unit 16, with a movement of the basic body 150 of the unloading apparatus 20 simultaneously also moving the conveying unit 22 and the collecting device 146.

The collecting device 146 is arranged at least in a working position in relation to the conveying unit 22 such that the collecting region 148 is arranged above the conveying plane 36. If a collected article 18 drops down from the collecting region 148, the article 18 can as a result pass directly onto the conveying plane 36, since the latter is arranged directly underneath the collecting region 148.

Furthermore, the collecting device 146 is divided into at least two regions. As described above, the collecting device 146 has the collecting region 148, which is formed by the upper end or the upper edge of the collecting device 146 and which is impacted by a dropping article 18, as a result of which the free fall of the latter is interrupted. This collecting region 148 is adjoined, in particular in a flush manner, by a guiding region 154, which serves to guide a collected article 18 as far as the conveying plane 36. In the example under consideration, the material of the collecting device 146 is selected such that the articles 18 slide on the guiding region 154—driven by their own weight force. In particular, the guiding region 154 is formed by a chute.

The collecting region 148 and the guiding region 154 of the collecting device 146 are formed by a surface which is inclined downward in relation to the conveying plane 36 and as seen in the unloading direction 24. During the unloading operation, the upper edge of the surface faces the stack 38 to be handled while the lower edge of the surface is arranged in the region of the conveying plane 36. The edges are oriented in each case parallel to one another, horizontally and perpendicularly to the unloading direction 24 (see FIG. 7).

Figure 7:
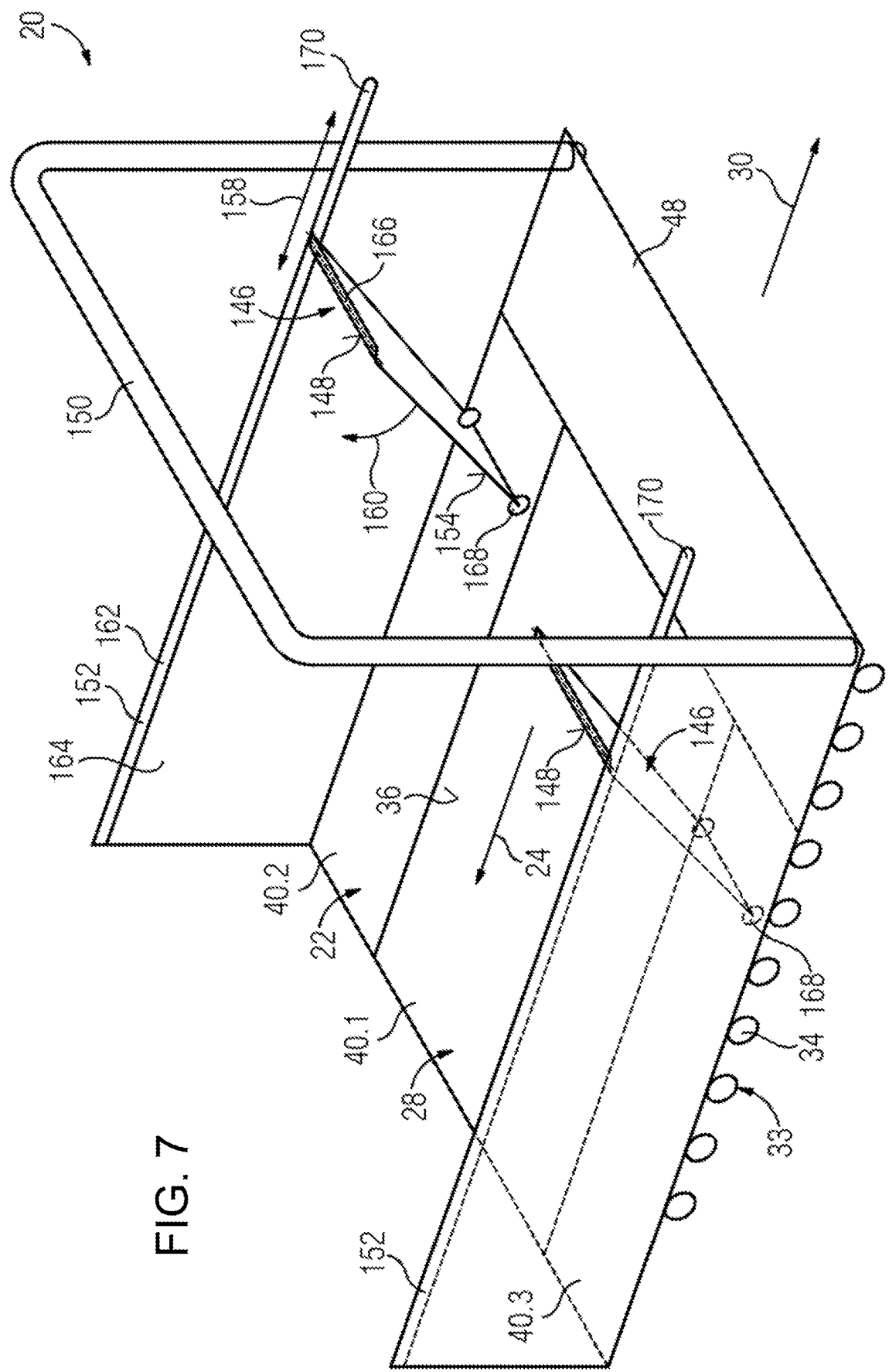
FIG. 7 shows a perspective view of the unloading apparatus having two collecting devices.
Figure 8:
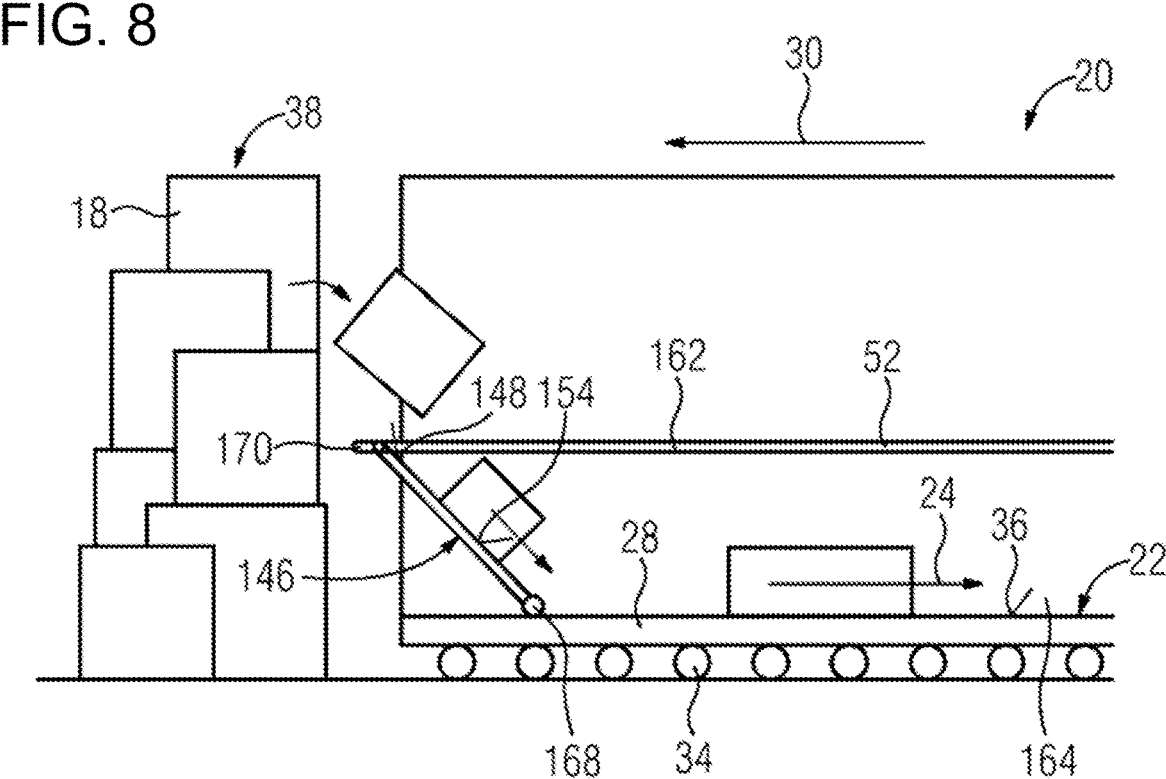
FIG. 8 shows a side view of the unloading apparatus having a collecting device in a working position.
Figure 9:
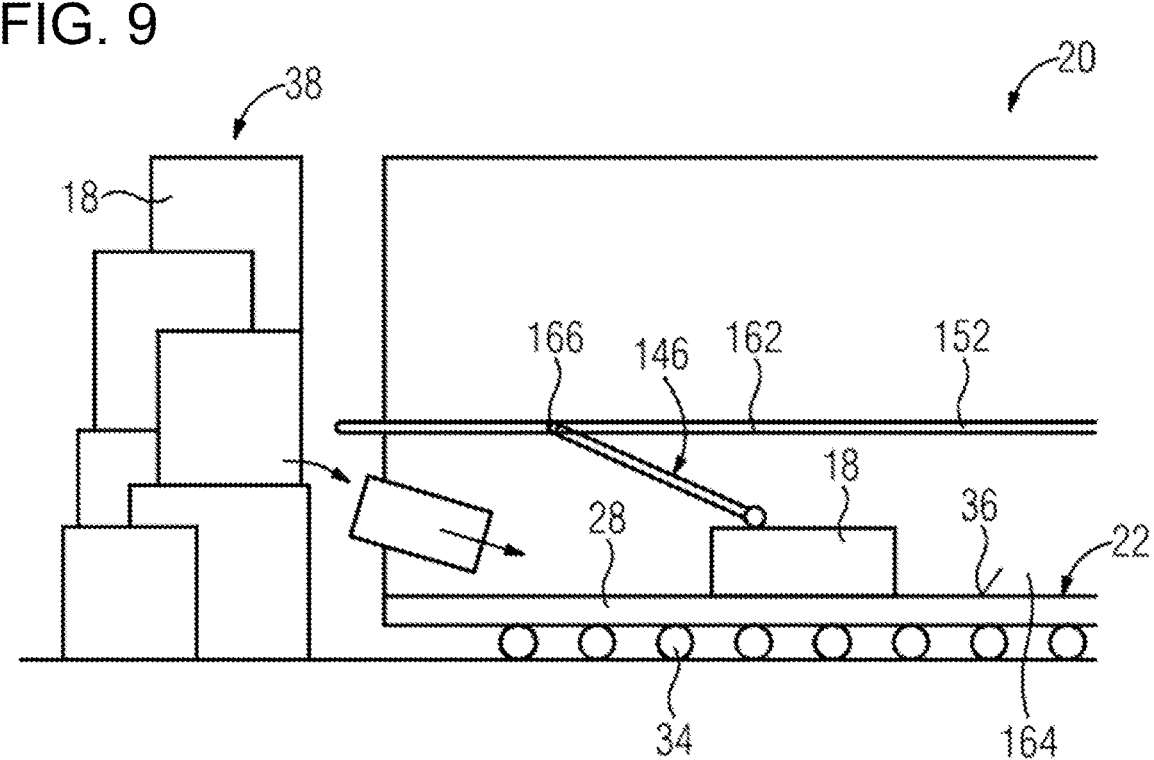
FIG. 9 shows the view from FIG. 8 with the collecting device in a passive position.

Further aspects and properties of the collecting device 146 are described in more detail with respect to FIGS. 7 to 9.

FIG. 7 shows a perspective view of the unloading apparatus 20 in a state moved out of the transporting unit 16.

The unloading apparatus 20 optionally has the working platform 48, which is provided to be walked on by an operator. During an unloading operation, the operator can stand on the working platform 48 and deal with the stack 38 of articles which is standing in front of him. Furthermore, reference is made to the above statements with regard to the working platform 48.

As is indicated by the arrows 158 and 160, the collecting device 146 is mounted such that it is able to move in relation to the conveying unit 22 or to the basic body 150. In this case, it has at least two degrees of freedom.

The collecting device 146 is formed such that it can be displaced in a linear manner and parallel to the unloading direction 24 (arrow 158). The movability of the collecting device 146 is provided by the mounting unit 152, which, as a guiding unit 162, allows the mounting point of the collecting device 146, at which the latter is mounted on the basic body 150, to be displaced in the unloading direction 24 and counter to the unloading direction 24. The guiding unit 162 is formed as a guiding element that extends in the unloading direction 24, and therefore horizontally, and is attached to a side wall 164 of the basic body 150.

Furthermore, the mounting unit 152 allows the collecting device 146 to pivot about an axis of rotation 166 (arrow 160). This axis of rotation 166 is oriented horizontally and perpendicularly to the unloading direction 24. During pivoting, the collecting device 146 rotates about its upper edge, which corresponds to the axis of rotation 166 and is held in the mounting unit 152 or guiding unit 162 such that it can be displaced in the unloading direction 24 and can be rotated (see also FIG. 9).

The basic body 150 has two opposite side walls 164 which are oriented vertically and parallel to one another and to the unloading direction 24 and which laterally bound the conveying plane 36. Attached to each side wall 164 is a mounting unit 152 which has the above-described features and by way of which collecting devices 146 are mounted on both sides of the unloading apparatus 20 such that they are able to move on the basic body 150. For the sake of clarity, the illustration of one side wall 164 has been dispensed with in FIG. 6.

At their lower end or in the region of their lower edge, the collecting devices 146 are provided with an undercarriage in the form of a plurality of contact bodies 168 which are in the form of rolling bodies and by way of which said collecting devices 146 are in contact with the conveying plane 36. In an alternative embodiment, the collecting devices 146 can make sliding contact with the conveying plane 36. Via the contact bodies 168, the collecting devices 146 are supported loosely on the conveying plane 36 by their own weight force.

FIGS. 8 and 9 show highly schematic side views of an unloading operation by means of the unloading apparatus 20 in two different operating modes. As in FIG. 6, the illustration of one of the side walls 164 has been dispensed with for the sake of clarity.

FIG. 8 shows the collecting device 146 in an operating mode, in which it assumes a working position in which it is supported on the conveying plane 36, in particular by means of the contact bodies 168, and has been moved up to the stack 38 of articles by means of the guiding unit 162. In order to move the collecting region 148 as close as possible to the stack 38 of articles, the guiding unit 162 has a projection 170, which, starting from the side wall 164, extends in the moving-in direction 30 or counter to the unloading direction 24. The collecting device 146 is displaced, in order to move it up to the stack 38 of articles, by the operator who is standing on the unloading apparatus 20 or, as seen in the moving-in direction 30, in front of said unloading apparatus 20 on the floor of the transporting unit 16. The operator first of all handles the articles 18 which are located in the upper region of the stack 38 of articles. In the process, these are simply toppled downwards. Free fall of these toppled articles 18 is interrupted, as explained above, by the collecting region 148 and the articles 18 are diverted by their own weight force onto the guiding region 154, on which they slide in order to pass onto the conveying plane 36. By means of the floor conveyor 28, they are conveyed in the unloading direction 24 out of the transporting unit 16.

Once the upper layer of the stack has been processed, the operator can displace the collecting device 146 in the unloading direction 24, in order thereby to create enough room for handling the lower layer of the stack. The collecting device 146 as a result arrives in a passive position, which is illustrated in FIG. 9. Since the collecting device 146 is arranged loosely on the conveying plane 36 and is mounted such that it can rotate about its upper edge on the mounting unit 152, it is pivoted upward by an article 18 which is conveyed by the floor conveyor 28 in the unloading direction 24. In such a passive position, the collecting device 146 does not represent an impediment to the flow of material. The possibility of pivoting the collecting device 146 is independent of its position in the unloading direction 24. In particular, the collecting device 146 can be pivoted upward at any time in the working position in FIG. 3. This allows alternate handling of articles 18 from the upper and lower layers of the stack.

When the lower layer of the stack has been processed by the operator, the unloading apparatus 20 can be moved further in the moving-in direction 30 in order to reduce the distance from the stack 38 of articles and the operator can move the collecting device 146 as close as possible to the stack 38.

The invention claimed is:

1. An unloading apparatus for unloading a transporting unit for transporting articles in an unloading direction, comprising:
   a conveying unit for conveying articles in the unloading direction out of the transporting unit and having at least one conveying plane; and
   at least one collecting device for collecting articles and conveying articles onto the conveying unit, said collecting device having at least one collecting region being upstream of said conveying unit in the unloading direction and arranged higher than the conveying plane, said collecting device being moveable in relation to said conveying unit, said collecting device being rotatably mounted for being pivoted about at least one axis of rotation caused by a passing article conveyed upon said conveying unit.

2. The unloading apparatus according to claim 1, wherein said conveying unit is a mobile conveying unit capable of being moved into the transporting unit for an unloading operation.

3. The unloading apparatus according to claim 1, wherein said conveying unit includes a floor conveyor that forms the conveying plane and conveys in a loose arrangement articles that have been toppled from a stack of articles, said collecting device is pivotable by passing articles carried on said floor conveyor between said floor conveyor and an underside of said collecting device.

4. The unloading apparatus according to claim 1, wherein said conveying unit and said collecting device form a cohesive unit.

5. The unloading apparatus according to claim 1, wherein said collecting region is arranged above the conveying plane at least in a working position of said collecting device.

6. The unloading apparatus according to claim 1, wherein said collecting device includes at least one guiding region to guide collected articles onto the conveying plane.

7. The unloading apparatus according to claim 6, wherein said guiding region facilitates sliding of collected articles.

8. The unloading apparatus according to claim 1, including a body structure, said conveying unit is mounted on said body structure, and said the collecting device is movably mounted on said body structure.

9. The unloading apparatus according to claim 1, wherein said collecting device is displaceable at least parallel to the unloading direction.

10. The unloading apparatus according to claim 9, including a guiding unit to guide said collecting device parallel to the unloading direction.

11. The unloading apparatus according to claim 1, wherein said collecting device includes at least one contact body to contact said collecting device with the conveying plane.

12. An unloading apparatus for unloading a transporting unit for transporting articles in an unloading direction, comprising:
- a conveying unit for conveying articles in the unloading direction out of the transporting unit and having at least one conveying plane, said conveying unit including a floor conveyor defining the conveying plane and conveying in a loose arrangement articles that have been toppled from a stack of articles; and
- at least one collecting device for collecting articles and conveying articles onto the conveying unit, said collecting device having at least one collecting region being upstream of said conveying unit in the unloading direction and arranged higher than the conveying plane, said collecting device being moveable in relation to said conveying unit, said collecting device being rotatably mounted for being pivoted about at least one axis of rotation caused by a passing article conveyed upon said conveying unit.

13. An apparatus for handling unloading of articles from a transporting unit, comprising:
- a mobile conveying unit movable into the transporting unit for unloading articles from the transporting unit, transporting articles stacked in the transporting unit under control of an operator and conveying the articles out of the transporting unit in an unloading direction for further processing; and
- said mobile conveying unit having a floor conveyor for conveying the articles removed from the stack of articles, said floor conveyor having an undercarriage with rollers for rolling on a floor of the transport unit and moving said mobile conveying unit into and out of the transport unit, said floor conveyor forming a conveying plane, the conveying plane extending perpendicular relative to the unloading direction over at least a substantial part of a width of the transporting unit, the substantial part of the width being at least 90% of the width of the transporting unit.

14. An unloading apparatus for unloading a transporting unit for transporting articles, comprising:
- a conveying unit for conveying articles in an unloading direction out of the transporting unit and having a conveying plane, said conveying unit having a floor conveyor for conveying the articles removed from the stack of articles, said floor conveyor forming the conveying plane, the conveying plane extending perpendicular relative to the unloading direction over at least a substantial part of a width of the transporting unit, the substantial part of the width being at least 90% of the width of the transporting unit; and
- at least one collecting device for collecting articles, said collecting device having at least one collecting region being arranged higher than the conveying plane.

* * * * *